United States Patent [19]
Peyser et al.

[11] 3,770,975
[45] Nov. 6, 1973

[54] CASSETTE DIRECTION DETECTOR

[75] Inventors: Leonard F. Peyser, Briarcliff Manor, N.Y.; Karl Leschanz, Alexandria, Va.

[73] Assignee: The Machlett Laboratories, Incorporated, Springdale, Conn.

[22] Filed: June 8, 1972

[21] Appl. No.: 260,955

[52] U.S. Cl. ............................... 250/491, 250/468
[51] Int. Cl. .................................................. H05g 1/00
[58] Field of Search ..................... 250/105, 66, 68, 250/491

[56] References Cited
UNITED STATES PATENTS
3,581,094  5/1971  Peyser et al. ................. 250/105
3,518,435  6/1970  Kok .............................. 250/105
3,502,878  3/1970  Stewart et al. ................ 250/105

FOREIGN PATENTS OR APPLICATIONS
1,170,303  11/1969  Great Britain ................. 250/468

*Primary Examiner*—James W. Lawrence
*Assistant Examiner*—B. C. Anderson
*Attorney*—Harold A. Murphy et al.

[57] ABSTRACT

X-ray apparatus including a modified Bucky tray having sensing means for determining the orientation of a film-bearing cassette held between two adjustable clamps and for producing a corresponding electrical signal, said means comprising a feeler probe which causes actuation of an electrical switch when the probe is contacted by an edge of a cassette disposed in one of two possible orthogonal positions.

10 Claims, 8 Drawing Figures

CASSETTE DIRECTION DETECTOR

BACKGROUND OF THE INVENTION

This invention relates generally to X-ray apparatus and is concerned more particularly with X-ray apparatus having sensing means for determining the orientation of an X-ray film.

Conventional X-ray systems generally employ a tray, commonly called a "Bucky" tray, for supporting a film-bearing cassette beneath the surface of an X-ray table. The Bucky tray usually is provided with a pair of spaced opposing clamps which are slidable simultaneously away from one another when a cassette is to be installed therebetween, and are slidable simultaneously toward one another to close on opposing edges of the cassette. The extent of the resulting spacing between the clamps is dependent on whether the cassette length dimension or width dimension is disposed between the clamps. When the cassette width dimension is disposed between the clamps, the cassette is said to be mounted in the "cross-tray" or "routine" position. On the other hand, when the cassette is disposed lengthwise between the clamps, the cassette is said to be mounted in the "cross-table" position.

The Bucky tray generally is slidably insertable in a receptacle in the X-ray table immediately beneath a preselected portion of a patient reclining on the table for X-ray diagnosis or treatment. An X-ray generator usually is located over the preselected portion of the patient and at a predetermined focal distance from the film-bearing cassette clamped to the tray. With specified electrical potentials applied to the electrodes of the X-ray generator, a cone of X-radiation emanates from a port in the generator which radiation passes through the preselected portion of the patient and impinges on the underlying X-ray film in the cassette.

However, the cone of X-radiation must be carefully controlled particularly when a human subject is being irradiated, in order to minimize exposure of the subject to the radiation. Therefore, a collimator device generally is disposed between the port of the X-ray generator and the patient for the purpose of controlling the cross-sectional size and configuration of the cone of X-radiation. In this manner, the X-ray beam may be limited to irradiating only the preselected portion of the patient by having the cross-sectional size and configuration of the beam conform substantially to the area and orientation of the X-ray film being used.

One type of X-ray apparatus particularly suitable for achieving this objective is shown and described in U.S. Pat. No. 3,581,094 granted to Leonard F. Peyser and Gordon F. Bavor and assigned to the assignee of this invention. The apparatus disclosed therein includes a collimator device which is adjustable automatically in accordance with electrical signals fed to it from other component parts of the system. One such signal is produced by a cassette direction sensing means comprising an electrical switch which is located in the tray receptacle and which is actuated by a linkage arm on the tray when the film-bearing cassette is installed in the cross-tray position. However, this cassette direction sensing means is dependent on the skill of the operator when inserting the tray into the receptacle.

Therefore, in order to ensure that the automatic collimator device will receive accurate information regarding film orientation, it is imperative that X-ray apparatus be provided with sensing means for determining the orientation of a film-bearing cassette independently of the skill of the operator.

SUMMARY OF THE INVENTION

Accordingly, this invention achieves the desired objective by providing a modified Bucky tray having located thereon a sensing means for determining the orientation of a film-bearing cassette clamped to the tray and for producing a corresponding electrical signal. This modified Bucky tray has the conventional two movable clamps, but one of the clamps is adapted to carry an electrical switch and an actuating arm which is pivotally mounted on the clamp. The pivotal arm extends longitudinally along the clamp and has a projecting end portion provided with a cam-shaped slot which is slidably engaged by a feeler probe. The probe has a rounded end portion extended toward the space between the two movable clamps of the Bucky tray and is affixed to one end of an arm having an opposing end portion rotatably attached to the tray. This rotatable arm is disposed at an acute angle with the pivotal arm, as measured clockwise from the pivotal arm to the rotatable arm, and causes the feeler probe to move arcuately while travelling linearly along the cam-shaped slot.

Thus, when the movable clamps of the Bucky tray are being spread apart for installation of a film-bearing cassette, the pivotal arm carried on one of the movable clamps acts through the periphery of the cam-shaped slot on the feeler probe to cause the rotatable arm to move angularly. As a result, the feeler probe while moving along an arcuate path travels linearly along the slot and laterally away from the supporting movable clamp. After the cassette is placed on the tray, the movable clamps are urged toward one another to engage opposing edges of the cassette. Consequently, the rotatable arm moves angularly in the opposite direction, and the feeler probe moves linearly back along the slot and laterally toward the supporting movable clamp. If the cassette is disposed in the cross-tray position, the feeler probe will contact the adjacent edge of the cassette held by the supporting movable clamp and, as a result, will be urged against the periphery of the cam-shaped slot. Thus, the pivotal arm will move angularly and actuate the electrical switch thereby producing an electrical signal which may be conducted to an automatic collimator, for example. In this manner, a cone of X-radiation may be modified by the collimator to conform with the orientation of the film-bearing cassette clamped to the tray. On the other hand, if the cassette is disposed in the cross-table position, the feeler probe will not contact the adjacent edge of the cassette held by the supporting movable clamp and, as a result, the pivotal arm will not actuate the switch to produce an electrical signal. Thus, the absence of an electrical signal from the switch is indicative that the cassette is in the cross-table position.

The supporting movable clamp also may carry a second switch which is actuated by the edge of the cassette being held by the movable clamp, regardless of the orientation of the cassette. Thus, this second switch will provide means for indicating whether or not a cassette is clamped to the tray.

BRIEF DESCRIPTION OF THE DRAWINGS

Other objectives and advantages of the present invention will be apparent from the following detailed description taken in conjunction with the accompanying drawings, wherein.

DESCRIPTION OF THE PREFERRED EMBODIMENT

Figure 1:
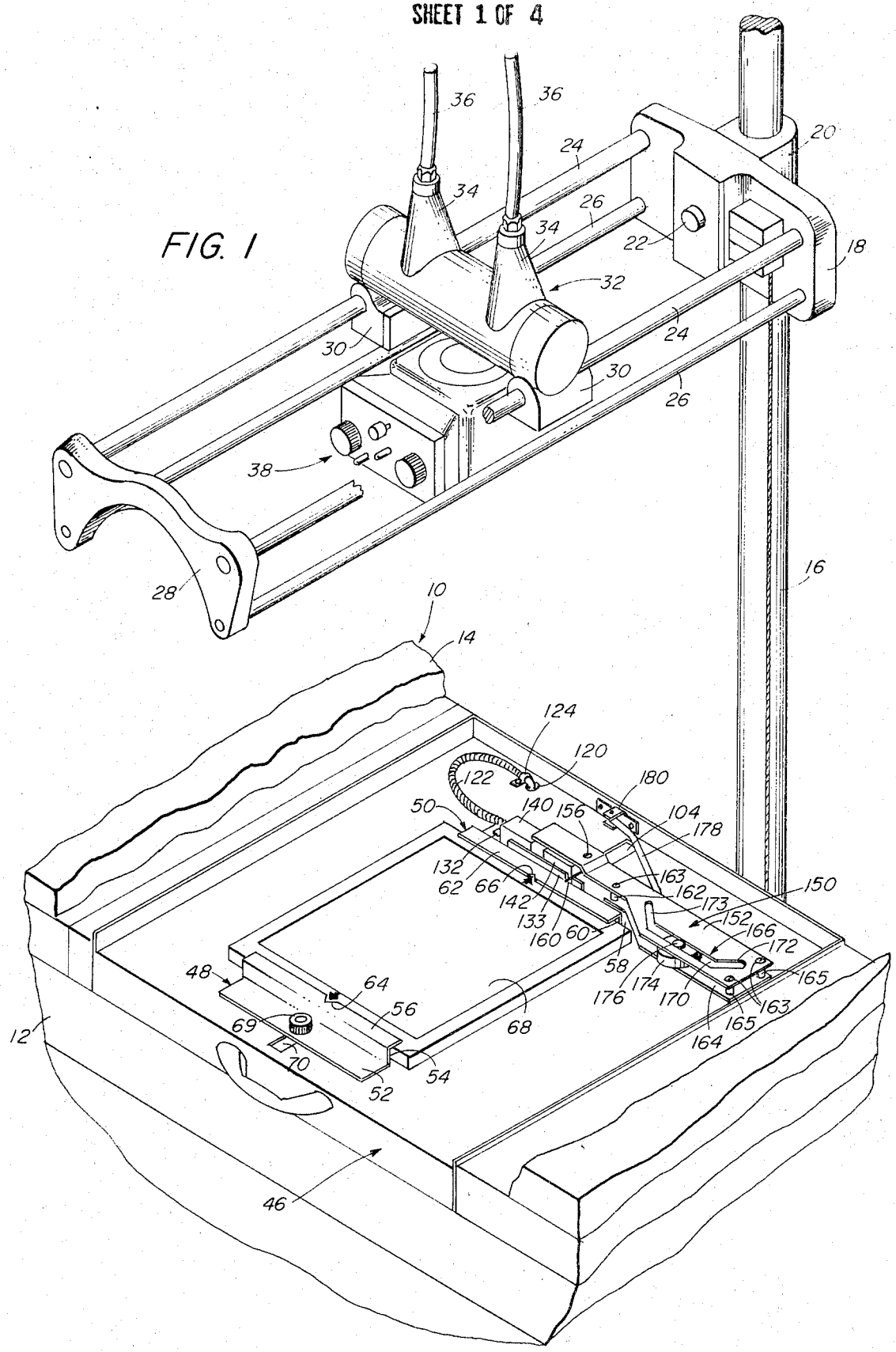
FIG. 1 is an isometric view of an X-ray apparatus embodying this invention.

Referring more particularly to the drawings wherein like characters of reference designate like parts throughout the several views, there is shown in FIG. 1 an X-ray table 10 having a base 12 and a top surface 14 on which a patient may recline for X-ray treatment. The table 10 may be of conventional construction and may be movable so as to position the patient for X-ray irradiation. Adjacent one longitudinal side of the table 10, a support post 16 is disposed substantially perpendicular to the surface 14 of the table and carries thereon a slidable bracket 18. The bracket 18 is provided with a hub 20 which encircles the post 16 and permits the bracket to be rotated about the post. The hub 20 may be provided with conventional means (not shown) for locking the bracket 18 in a selected position and with a radially extending pin 22 about which the bracket may be pivoted.

Opposing pairs of upper and lower rails, 24 and 26, respectively, extend outwardly from the bracket 18 and terminate at their respective distal ends in a bracket 28. The uppeer rails 24 carry respective slidable lugs 30 which support an X-ray generator 32 having a pair of spaced horns 34 by which cables 36 are electrically connected to the electrodes of the generator. The X-ray generator 32 may be any conventional type which produces, when specified electrical potentials are applied to the electrodes thereof, a cone of radiation which may be directed downward toward the surface 14 of table 10. The cone of radiation passes through a suitable X-ray collimator 38 having automatic means for providing the cone with a desired cross-sectional size and configuration in accordance with electrical signals produced by other component parts of the system. This system is described more fully in the previously mentioned U.S. Pat. No. 3,581,094.

Slidably disposed in table 10, immediately beneath the top surface 14, is a modified Bucky tray 46 having two opposing clamps, 48 and 50, respectively, which are slidably mounted on its upper surface for simultaneous movement toward and away from one another. The clamp 48 comprises a flat base portion 52 integrally joined to an upright intermediate wall portion 54 which supports a projecting shelf portion 56. Similarly, clamp 50 comprises a flat base portion 58 integrally joined to an upright intermediate wall portion 60 which supports a projecting shelf portion 62. Centrally disposed in the terminal edges of the respective shelf portions 56 and 62 are V-shaped notches, 64 and 66, respectively, which are aligned with the longitudinal center line of tray 46. Thus, when a film-carrying cassette, such as 68, for example, is placed between the clamps 48 and 50, scribe marks, such as arrows, for example, which are centrally located on respective opposing edges of the cassette may be positioned within the V-shaped notches 64 and 66, respectively, thereby disposing the cassette centrally on the tray 46.

Figure 2:
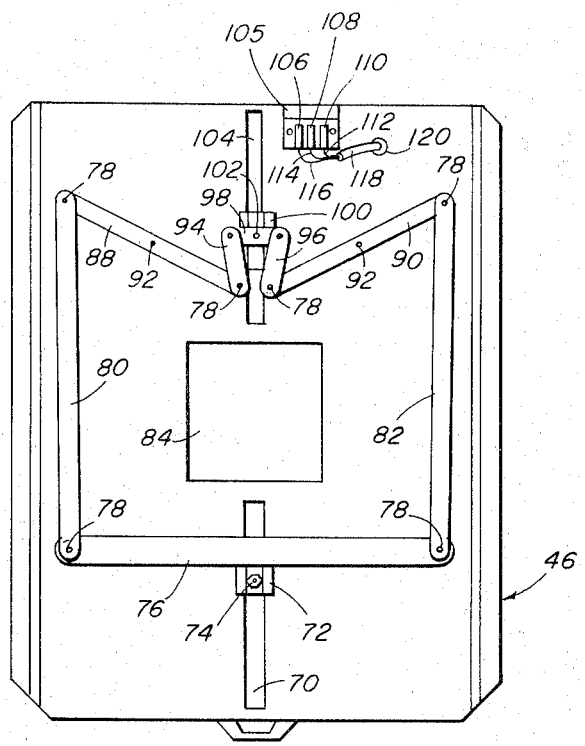
FIG. 2 is an enlarged bottom plan view of the modified Bucky tray shown in FIG 1.
Figure 4:
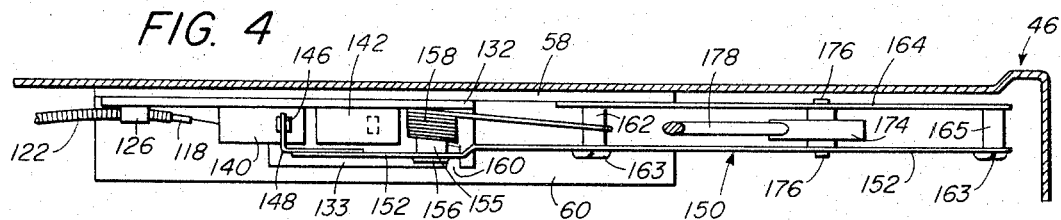
FIG. 4 is a cross-sectional view taken along the line 4—4 in FIG. 3, looking in the direction of the arrows.

A knurled-headed screw 69 has a shaft portion extending through a centrally disposed aperture (not shown) in the base portion 52 of clamp 48 and through an underlying slot 70 which is disposed substantially on the longitudinal centerline of tray 46. Referring to FIG. 2, wherein the underside of tray 46 is shown, the shaft of screw 69 also passes through a clamping plate 72 disposed against the underside of tray 46 and is threadingly engaged by a nut 74. The clamping plate 72 is fixedly attached, as by welding, for example, to a central portion of a linkage cross-arm 76. Thus, it may be seen that when the screw 69 is loosened, the clamp 48 may be moved along the slot 70, and the clamping plate 72 will carry the linkage cross-arm 76 an equal distance in the same direction on the underside of tray 46. When the clamp 48 reaches a newly selected position, the screw 69 may be tightened thereby fixing the clamp 48 and the linkage cross-arm 76 in place.

Opposing end portions of the cross-arm 76 are pivotally attached, as by rivets 78, for example, to overlapping end portions of respective linkage straps 80 and 82. The straps 80 and 82 extend longitudinally of the tray 46 on respective opposite sides of a centrally disposed opening 84 which is intended for phototiming purposes and is not concerned with this invention. The respective other end portions of linkage straps 80 and 82 overlap and are pivotally attached to end portions of respective arms 88 and 90. The arms 88 and 90 have respective central portions rotatably attached, as by upwardly extending studs 92, for example, to the tray 46 and have respective other end portions pivotally attached to end portions of pivotal links 94 and 96, respectively. The pivotal links 94 and 96, in turn, have respective other end portions pivotally attached to respective opposing ends of a cross-strap 98.

The cross-strap 98 overlies a clamping plate 100 and is fixedly connected to the clamp 50 on the upper surface of tray 46 by means of a pin 102 which passes through the clamping plate 100 and a slot 104 in the tray. The slot 104 is longitudinally aligned with the slot 70 disposed on the opposite side of the central opening 84 in the tray 46. Thus, it may be seen that when the clamp 48 is moved along the slot 70 toward the central opening 84, the cross-arm 76 and linkage straps 80–82 will rotate the arms 88–90 clockwise as viewed in FIG. 2. As a result, the pivotal links 94–96 will exert a pulling force on the cross-strap 98 thereby causing the clamp 50 to move toward the central opening 84 simultaneously with the similar movement of clamp 48. Conversely, when the clamp 48 is moved along the slot 70 away from the central opening 84, the cross-arm 76 and linkage straps 80–82 will rotate the arms 88–90 in a counterclockwise direction as viewed in FIG. 2. As a result, the pivotal links will exert a pushing force on the cross-strap 98 thereby causing the clamp 50 to move away from the central opening 84 simultaneously with the similar movement of clamp 48. In this manner, the clamps 48–50 may be spread apart for the installation of a film-carrying cassette, such as 68, for example, When the arrows scribed centrally on respective opposing edges of the cassette are positioned within the respective notches 64 and 66, as previously described, the clamps 48–50 may be moved toward one another until respective wall portions 54 and 60 of the clamps 48 and 50 butt against opposing side walls of the cassette. Then, the screw 69 may be tightened and the cassette will be firmly clamped in place on the tray 46.

Standard cassette sizes commonly utilized for X-ray diagnosis and treatment include the following: 5 inches by 7 inches, 8 inches by 10 inches, 10 inches by 12 inches, 11 inches by 14 inches, and 14 inches by 17 inches. Any one of these cassette sizes may be accommodated by the tray as previously described. However, a cassette may be installed lengthwise between the clamps 48 and 50, commonly referred to as the "crosstable" position, or orthogonally thereto which is commonly referred to as the "cross-tray" or "routine" position. As shown in FIG. 1, the cassette 68 is installed in the cross-table position. If the cassette were rotated 90°, it would be installed in the cross-tray or routine position. In accordance with this invention, it is necessary that an automatic collimator, for example, be provided with electrical information regarding the orientation of a cassette installed between the clamps of a Bucky. Therefore, the modified Bucky tray of this invention is provided with a cassette orientation sensing means, a major portion of which is carried on the movable clamp 50.

As shown in FIG. 2, affixed to the underside of tray 56, adjacent the rear edge thereof, is a dielectric sheet 105 carrying three spaced contacts 106, 108 and 110, respectively, which are designed to slidably engage similar contacts (not shown) in the tray receptacle of table 10. Connected to the contacts 106, 108 and 110 are respective wires 112, 114 and 116 of a cable 118 which extends through a grommet 120 in tray 46 and, on the upper surface of the tray, passes through a helical spring 122, as shown in FIG. 1. The spring 122 and the enclosed portion of cable 118 are held in a generally C-shaped configuration by a clamp 124 which is fixedly attached to the tray and a clamp 126. As shown more clearly in FIG. 3, the clamp 126 is secured to a plate 132 by a screw 130 and cooperating nut 134 which also are utilized for fixedly attaching the plate 130 to the base portion 58 of clamp 50.

The plate 132 also is attached to the base portion 58 of clamp 50 by screws 138 which also are utilized for mounting respective electrical switches 140 and 142 on the plate 132. The wire 112 which carries electrical current to the tray is electrically connected to one side of each of the switches 140 and 142, respectively. The wire 114 is electrically connected to the other side of switch 140, and the wire 116 is electrically connected to the other side of switch 142. The switch 142 is actuated by a spring loaded button 144 which extends through an upwardly extending wall portion 133 of plate 132 and through the wall portion 60 of movable clamp 50. Thus, when the wall portion 60 butts against the side wall of an installed cassette, as previously described, the button 144 will be compressed thereby closing the switch 142. The resulting flow of current through wire 114 constitutes an electrical signal indicating that a cassette is clamped in position on the tray 46.

The switch 140 is actuated by a spring-loaded button 146 which extends rearwardly of the plate 132 and terminates adjacent a downwardly extending tab of an L-shaped bracket 148. The bracket 148 forms part of a pivotal arm 150 having an upper plate 152 to which the bracket 148 is adjustably attached by suitable means, such as screws 154 which extend through oversized holes (not shown) in the plate 152 and threadingly engage an underlying portion of the bracket 148, for example. The plate 152 is pivotally mounted on an upper end of a tubular stud 155 which has a lower end fixedly attached to the plate 132 and an internally threaded surface engaged by a screw 156 extending through the plate 152.

Encircling the stud 155 is a coil spring 158 having one end retained in a notch 160 which is cut in the upwardly extending wall portion 133 of plate 132. The other end of spring 158 bears against a tubular stud 162 which is disposed between a laterally projecting end portion of plate 152 and an underlying plate 164. The stud 162 and two similar studs 165 adjacent the projecting end of arm 150 extend upwardly from the plate 164 and are threadingly engaged by respective screws 163 which extend through the plate 152, thereby maintaining the plate 164 in substantially uniform spaced relationship with the plate 152. Thus, the plate 164 is carried by the laterally projecting end portion of plate 152 and constitutes a part of the pivotal arm 150 which is resiliently urged, by coil spring 158, toward the space between the respective clamps 48 and 50.

The laterally projecting end portion of plate 152 is provided with a cam-shaped slot 166 which is aligned with a similar cam-shaped slot 168 disposed in the underlying plate 164. Each of the cam-shaped slots 166 and 168 is provided with a respective intermediate portion 170 and diverging angular end portions 172 and 173, respectively. Slidably disposed in the space between the plate 158 and the laterally projecting end portion of plate 152 is a circular feeler probe 174 having an axial pin 176 which has opposing end portions slidably disposed in the slots 166 and 168, respectively. A chordal portion of the feeler probe 174 protrudes into the space between the movable clamps 48 and 50, and a peripheral portion of the probe 174 is fixedly attached, as by welding, for example, to one end of a rod-like arm 178. The arm 178 is disposed at an acute angle with the pivotal arm 150, as measured clockwise from the pivotal arm 150 to the rotatable arm 178, and, at the other end, is rotatably mounted in a bracket 180 which is fixedly attached to a rear wall of tray 46, as by screws 182, for example.

Thus, it may be seen that the rotatable arm 178 forms the hypoteneuse of a right triangle having one side parallel with the slot 104 in tray 46 and the other side lying along the pivotal arm 150. When the clamp 50 is moved away from the central opening 84 in tray 46, as previously described, it carries the pivotal arm 150. As a result, the peripheries of respective cam-shaped slots 166 and 168 bear against the pin 176 of feeler probe 174 thereby rotating the arm 178 in the counterclockwise direction, as viewed in FIG. 3. Consequently, the feeler probe 174 will slide along the slots 166 and 168, respectively, in a direction laterally away from the movable clamp 50. Thus, the previously mentioned right triangle will have a shorter side parallel with the slot 104 and a longer side lying along the pivotal arm 150. In this manner, the feeler probe 174 is suitably positioned when a larger size cassette is installed between the clamps 48 and 50.

Figure 3:
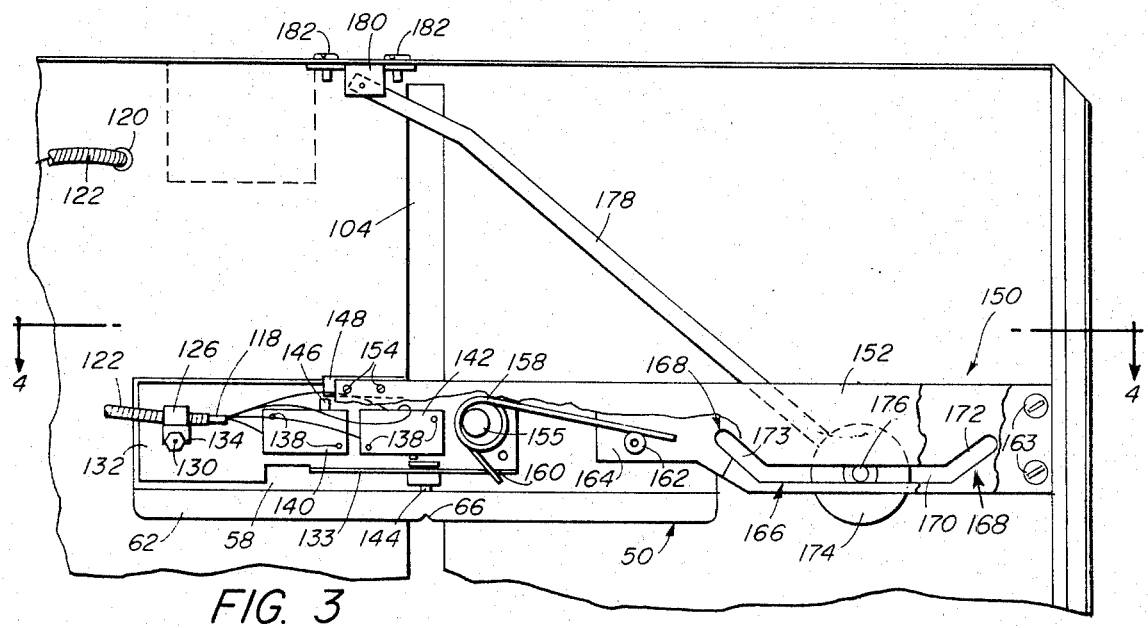
FIG. 3 is an enlarged fragmentary top plan view of the modified Bucky tray shown in FIG. 1.

Conversely, when the clamp 50 is moved toward the central opening 84, the rotatable arm 178 will be moved by the pivotal arm 150 in a clockwise direction as viewed in FIG. 3. As a result, the feeler probe 174 will slide along the slots 166 and 168, respectively, in a direction laterally toward the movable clamp 50. Therefore, the previously mentioned right triangle will have a longer side parallel with the slot 104 and a shorter side lying along the pivotal arm 150. Thus, the feeler probe 174 will be suitably positioned when a smaller size cassette is installed between the clamps 48 and 50.

Figure 5:
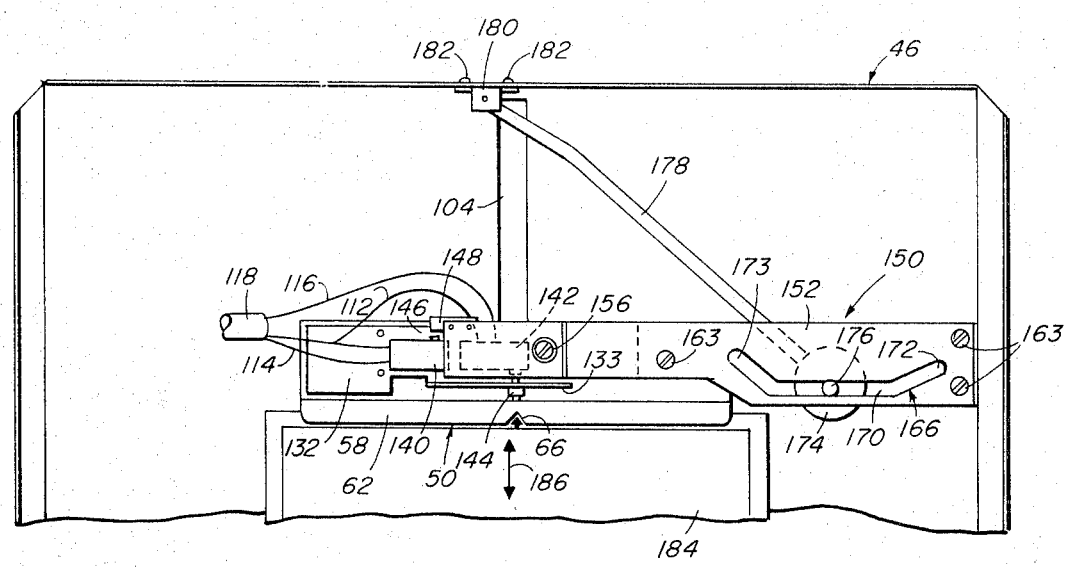
FIG. 5 is a fragmentary top plan view of the tray shown in FIG. 1 with a standard eight inch by ten inch cassette mounted in the cross-table position.
Figure 6:
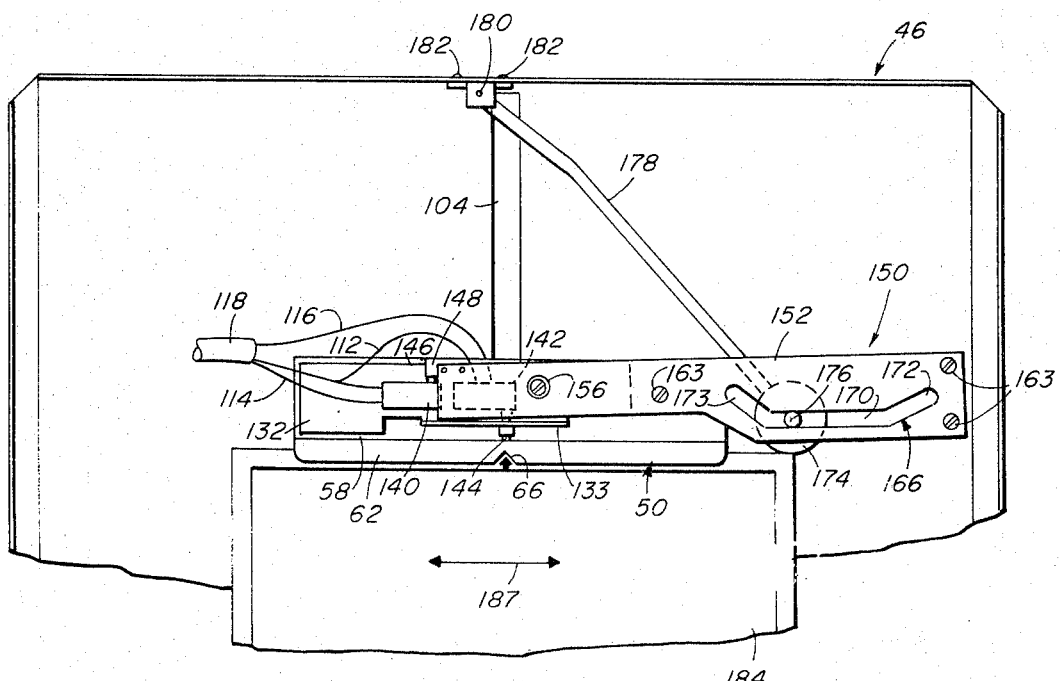
FIG. 6 is a fragmentary top plan view similar to FIG. 5 but with the cassette mounted in the cross-tray position.

As shown in FIG. 5, when a standard 8 inch by 10 inch cassette 184 is installed in the cross-table position, as indicated by the arrow 186 showing the longitudinal axis of the cassette, the feeler probe 174 is positioned a sufficient lateral distance from the longitudinal centerline of the tray 46 that it does not contact the cassette 184. However, as shown in FIG. 6, when the cassette 184 is rotated ninety degrees and installed in the cross-tray position, as indicated by the arrow 187, the feeler probe 174 is positioned laterally from the centerline of tray 46 a suitable distance for contacting the cassette, when the side wall portion 60 of clamp 50 butts against the adjacent side wall of the cassette, as previously described. When the feeler probe senses that the cassette 184 is in the cross-tray position, it bears against the peripheries of the cam-shaped slots 166 and 168, respectively, thereby pivoting the arm 150. As a result, the tab of L-shaped bracket 148 presses the button 146 to actuate switch 140 and send current flowing through the wire 114. This current flow in wire 114 provides the required electrical signal indicating that the cassette 184 is in the cross-tray position.

Figure 7:
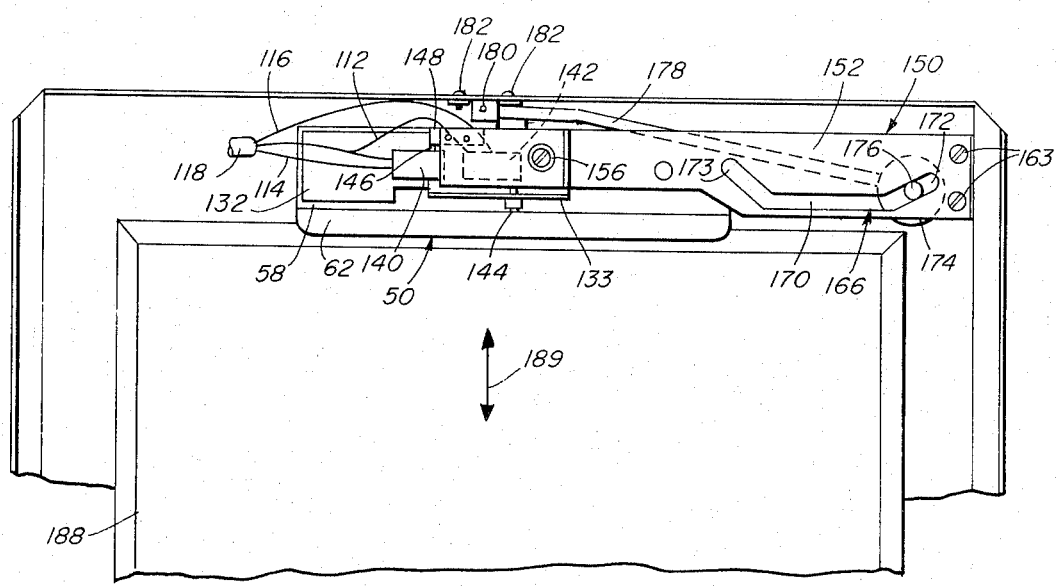
FIG. 7 is a fragmentary top plan view of the tray shown in FIG. 1 with a standard fourteen inch by seventeen inch cassette mounted in the cross-table position.

As shown in FIG. 7, when a standard fourteen inch by seventeen inch cassette 188 is installed in the cross-table position, the clamp 50 is moved away from the central opening 84 a distance such that the arm 178 is prevented from rotating any further by the rear wall of tray 46. Consequently, the feeler probe 174 will not be moved laterally away from the longitudinal centerline of tray 46 a sufficient distance to avoid contacting the cassette 188. Therefore, the cam-shaped slots 166 and 168 are provided with respective angled end portions 172 whereby the axial pin 176 slidably travelling therein retracts the feeler probe 174 almost entirely into the space between the plate 164 and the laterally projecting end portion of plate 152. As a result, the feeler probe does not contact the cassette 188 when it is in the cross-table position.

Figure 8:
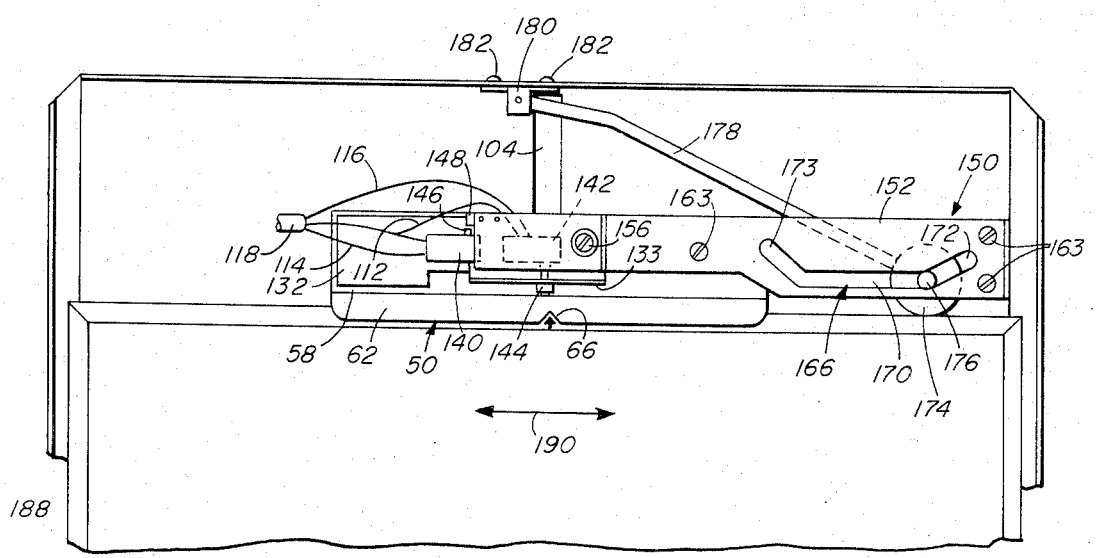
FIG. 8 is a fragmentary top plan view similar to FIG. 7 but with the cassette mounted in the cross-tray position.

However, as shown in FIG. 8, when the cassette 188 is rotated 90° and installed in the cross-tray position, as indicated by the arrow 190, the clamp 50 is moved toward the central opening 84. As a result, the arm 178 is rotated in the clockwise direction and the feeler probe slides from the angular end portions of the respective slots 166–168 back into the intermediate portions 169. Thus, the probe 174 is positioned a suitable lateral distance from the longitudinal centerline of tray 46 to contact the cassette 188 when it is clamped in place. Consequently, the probe 174 will pivot the arm 150 and close the switch 140, as previously described, thereby sending current through the wire 114.

From the foregoing, it will be apparent that all of the objectives of this invention have been achieved by the structures shown and described. It will be also apparent, however, that various changes may be made by those skilled in the art without departing from the spirit of the invention as expressed in the appended claims. It is to be understood, therefore, that all matter shown and described is to be interpreted as illustrative and not in a limiting sense.

We claim:

1. X-ray apparatus comprising:
   a film cassette-supporting tray;
   a pair of spaced opposing clamps mounted on the tray, one of the clamps being movable toward and away from the other clamp;
   cassette direction sensing means carried on the movable clamp for detecting the orientation of a cassette when it is clamped to the tray; and
   signal means mounted on the movable clamp in aligned operative relationship with the direction sensing means for indicating the orientation of the cassette.

2. X-ray apparatus as set forth in claim 1 wherein the direction sensing means includes a linkage arm pivotally mounted on the movable clamp, the arm having one end disposed adjacent the space between the clamps and an opposing end disposed adjacent the signal means.

3. X-ray apparatus as set forth in claim 2 wherein the direction sensing means includes a feeler probe carried by said one end of the pivotal arm and extending into the space between the clamps.

4. X-ray apparatus as set forth in claim 2 wherein the signal means includes an electrical switch having an actuating member disposed adjacent said opposing end of the pivotal arm for operative engagement therewith when the cassette is clamped in one of two orthogonal positions.

5. X-ray apparatus comprising:
   a film cassette-supporting tray;
   first and second elongated clamps mounted on the tray in spaced opposing relationship with one another, the first clamp being movable toward and away from the second clamp;
   an arm pivotally mounted on the first clamp and extending longitudinally thereof, the arm having an end portion overlying the clamp and an opposing end portion extended beyond one end of the clamp, the extended end portion having a slot longitudinally disposed therein;
   an electrical switch mounted on the first clamp and having an actuating member disposed adjacent said opposing end portion of the arm;
   a feeler probe having a projection slidably engaged in said slot disposed in the extended portion of the pivotal arm space between the clamps; and
   means for sliding the feeler probe projection along the slot relative to the first clamp when the first clamp is moved relative to the second clamp.

6. X-ray apparatus as set forth in claim 5 wherein said sliding means includes means for urging the feeler probe projection linearly along the slot and laterally toward the first clamp when the first clamp is moved toward the second clamp, and for urging the feeler probe projection linearly along the slot and laterally away from the first clamp when the first clamp is moved away from the second clamp.

7. X-ray apparatus as set forth in claim 5 wherein said sliding means includes a rotatable arm having one end fixedly attached to the feeler probe and an opposing end rotatably attached to the tray.

8. X-ray apparatus as set forth in claim 7 wherein the rotatable arm is disposed at an acute angle with the pivotal arm as measured clockwise from the pivotal arm to the rotatable arm.

9. X-ray apparatus as set forth in claim 5 wherein the slot is provided with camming means for slidably withdrawing the feeler probe from the space between the clamps.

10. X-ray apparatus as set forth in claim 9 wherein the camming means comprises an angularly extended end portion of the slot.

* * * * *